(12) United States Patent
Maeda

(10) Patent No.: US 8,339,083 B2
(45) Date of Patent: Dec. 25, 2012

(54) MOTOR CONTROLLING METHOD AND APPARATUS THEREOF

(75) Inventor: Toshiyuki Maeda, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 1342 days.

(21) Appl. No.: 11/415,152

(22) Filed: May 2, 2006

(65) Prior Publication Data

US 2006/0192512 A1 Aug. 31, 2006

Related U.S. Application Data

(62) Division of application No. 10/485,544, filed as application No. PCT/JP03/02091 on Feb. 25, 2003, now Pat. No. 7,075,260.

(30) Foreign Application Priority Data

Feb. 25, 2002 (JP) ................................. 2002-47546

(51) Int. Cl.
*H02P 1/04* (2006.01)
*H02P 7/00* (2006.01)

(52) U.S. Cl. ..................... 318/443; 318/432; 318/635

(58) Field of Classification Search .......... 318/432–434, 318/443, 461, 633, 635, 638, 798, 799, 809
See application file for complete search history.

(56) References Cited

U.S. PATENT DOCUMENTS

| | | | |
|---|---|---|---|
| 4,357,569 A | 11/1982 | Iwakane et al. | |
| 4,825,131 A * | 4/1989 | Nozaki et al. | 318/52 |
| 5,300,872 A * | 4/1994 | Endo et al. | 318/802 |
| 5,402,054 A | 3/1995 | Eckersley | |
| 5,548,199 A | 8/1996 | Bidaud et al. | |
| 5,767,652 A | 6/1998 | Bidaud et al. | |
| 5,969,500 A | 10/1999 | Ishikawa et al. | |
| 5,982,133 A | 11/1999 | Murakami et al. | |
| 6,051,952 A | 4/2000 | Moreira et al. | |

(Continued)

FOREIGN PATENT DOCUMENTS

AT 397 727 B 6/1994

(Continued)

OTHER PUBLICATIONS

Examination Rerport of corresponding Singaporean Application No. 200506493-6 Dated May 14, 2010.

(Continued)

*Primary Examiner* — Eduardo Colon Santana
(74) *Attorney, Agent, or Firm* — Global IP Counselors

(57) ABSTRACT

A voltage detection section and current detection section detect a voltage and current supplied to a motor, and the detected voltage and current are supplied to a position detection section. An angular speed output from the position detection section is supplied to a differentiator to output an angular acceleration. A fundamental wave component extraction section extracts a fundamental wave component of the angular acceleration, and the extracted fundamental wave component is supplied to an amplitude adjustment section. The output of the amplitude adjustment section is subtracted from the average current command by a subtraction section. This subtraction result, current detection value, and the rotor position from the position detection section are supplied to a current control section to carry out the current control operation so as to obtain a current command. The current command is supplied to an inverter to control the voltage and current so as to suppress the speed changing due to the load torque changing. Thus, stability is improved, and a decrease in cost is realized.

8 Claims, 13 Drawing Sheets

U.S. PATENT DOCUMENTS

| | | |
|---|---|---|
| 6,153,956 A | 11/2000 | Branecky |
| 6,208,109 B1 | 3/2001 | Yamai et al. |
| 6,294,891 B1 | 9/2001 | McConnell et al. |
| 6,326,762 B1 * | 12/2001 | Jiang et al. .................. 318/811 |
| 6,781,334 B2 * | 8/2004 | Ishii .............................. 318/432 |
| 6,796,183 B2 | 9/2004 | Noell |
| 6,936,991 B2 * | 8/2005 | Chen et al. .................. 318/700 |
| 7,075,260 B2 * | 7/2006 | Maeda .......................... 318/443 |
| 7,906,923 B2 * | 3/2011 | Satake .................... 318/400.02 |
| 8,129,933 B2 * | 3/2012 | Maeda .......................... 318/443 |
| 2002/0158180 A1 | 10/2002 | Noell |

FOREIGN PATENT DOCUMENTS

| | | |
|---|---|---|
| JP | 01-133585 A | 5/1989 |
| JP | 01-218380 A | 8/1989 |
| JP | 2-79793 | 3/1990 |
| JP | 08-223993 A | 8/1996 |
| JP | 9-33145 A | 2/1997 |
| JP | 09-84385 A | 3/1997 |
| JP | 11-018436 A | 1/1999 |
| JP | 11-27997 A | 1/1999 |
| JP | 11-055986 A | 2/1999 |
| JP | 2000-217384 A | 8/2000 |
| JP | 2001-37281 | 2/2001 |
| JP | 2001-292578 A | 10/2001 |
| JP | 2002-44985 A | 2/2002 |
| JP | 2003-92895 | 3/2003 |

OTHER PUBLICATIONS

Office Action of corresponding Japanese Application No. 2003-570460 Dated Sep. 7, 2010.

Japanese Office Action of corresponding Japanese Applicacon No. 2009-120977 dated Dec. 20, 2011.

Japanese Office action od corresponding Japanese Application No. 2009-013987 dated Dec. 6, 2011.

* cited by examiner (A)    (B)

(A) Current command (B) Current for a case that no dead time correction is carried out (A) Ordinary current command (B) Clipped current command

MOTOR CONTROLLING METHOD AND APPARATUS THEREOF

CROSS-REFERENCE TO RELATED APPLICATIONS

This application is a divisional application of U.S. patent application Ser. No. 10/485,544 filed on Feb. 2, 2004. The entire disclosure of U.S. patent application Ser. No. 10/485,544 is hereby incorporated herein by reference.

TECHNICAL FIELD

The present invention relates to a method and apparatus for controlling a motor for driving a periodical load so as to suppress changing in its rotation speed.

BACKGROUND ART

From the past, a method is proposed for repetitively controlling a voltage, current so as to cancel a changing in speed due to a changing in load torque, as a method for controlling a motor for driving a periodical load so as to suppress changing in its rotation speed.

When this method is employed, and when fidelity is improved, a disadvantage arises in that instability is realized in higher harmonics. Oh the contrary, when fidelity is lowered, a disadvantage arises in that shifting in phase is realized.

When fidelity is improved, a disadvantage arises in that the current becomes too great, power devices and a motor with great capacity should be employed, thereby increase in cost is realized.

Further, a method is also proposed for detecting a rotor position of a motor based upon the detection values for voltage and current and the instrument constants of the motor, without employment of a rotary encoder or the like. As the instrument constants, determined values are used as they are, or values adjusted at the manufacturing timing are used. Therefore, a disadvantage arises for the former case in that an area is generated due to the changing of the instrument constants, within the area the motor cannot be driven. A disadvantage arises for the latter case in that increase in cost is realized.

Particularly, when the voltage and current are controlled so as to cancel speed changing due to load torque changing, a disadvantage arises in that the processing for detecting a rotor position of a motor is possibly diverged.

The present invention was made in view of the above disadvantages.

It is an object of the present invention to offer a motor controlling method and apparatus thereof which can improve stability and can realize decrease in cost when a voltage and current are controlled so as to suppress speed changing due to load torque changing.

It is another object of the present invention to offer a motor controlling method and apparatus thereof which can improve rotor position detection accuracy by identifying the instrument constants when a rotor position of a motor is detected based upon detection values for voltage and current and the instrument constants of the motor without using a rotary encoder or the like.

DISCLOSURE OF THE INVENTION

In a first aspect of the present invention, a motor controlling method is provided for controlling a voltage or current applied to a motor driving periodical load so as to suppress rotation speed changing of the motor, the method comprises the steps of:

Detecting at least a fundamental wave component of an angular acceleration; and

Controlling the voltage or current applied to the motor so as to determine a phase of a fundamental wave component of output torque changing to be nearly reversed phase with respect to the phase of the fundamental wave component of the detected angular acceleration.

In a second aspect of the present invention, a motor controlling method controls amplitude of the output torque changing so that the fundamental wave component of the angular acceleration becomes 0.

In a third aspect of the present invention a motor controlling method employs a value consisting of a sum of a direct current component and a fundamental wave component, as at least one of an output voltage, output current, and torque command.

In a fourth aspect of the present invention, a motor controlling method of a motor for driving a compressor as the motor, and employs a value formed in correspondence with a torque changing waveform of the compressor as the output voltage, current, or torque command.

In a fifth aspect of the present invention, a motor controlling method employs a motor for driving a compressor as the motor, and employs a value formed to fit a typical torque changing waveform of the compressor as the output voltage, current, or torque command.

In a sixth aspect of the present invention, a motor controlling method is provided for controlling a voltage or current supplied to a motor from an inverter so as to suppress rotation speed changing of the motor with respect to a periodical load, the method comprises the steps of;

Partially outputting negative torque from the inverter, and

Utilizing regeneration power during the above operation for motor driving again.

In a seventh aspect of the present invention, a motor controlling method further carries out compensation operation for dead time of the output voltage.

In an eighth aspect of the present invention, a motor controlling method is provided for controlling a voltage or current supplied to a motor from an inverter so as to suppress rotation speed changing of the motor with respect to a periodical load, the method comprises the step of;

Controlling the voltage or current not to exceed a current maximum value of power devices of the inverter taking precedence over the suppression of rotation speed changing.

In a ninth aspect of the present invention, a motor controlling method controls the voltage or current not to exceed a current maximum value of power devices of the inverter by reducing the amplitude of the output torque changing.

In a tenth aspect of the present invention, a motor controlling method controls the voltage or current not to exceed a current maximum value of power devices of the inverter by changing the waveform of the current, voltage or torque command into a form having a lower peak current with respect to the average current.

In an eleventh aspect of the present invention, a motor controlling method carries out the changing of the waveform by clipping the waveform of the current, voltage or torque command with a standard value.

In a twelfth aspect of the present invention, a motor controlling method calculates information for a rotor position using a current and voltage applied to a motor and the instrument constants of the motor, and controls the voltage or current applied to the motor based upon the calculated information, the method comprises the step of;

Reducing the affection of an error of the instrument constants of the motor, or an error of a sensor for detection of the current, voltage based upon characteristic property of load.

In a thirteenth aspect of the present invention, a motor controlling method carries out the reduction of the affection of the error of the instrument constants of the motor, or the error of a sensor when an ordinary load is driven.

In a fourteenth aspect of the present invention, a motor controlling method employs a compressor as the load of the motor, and reduces the affection of the error of the instrument constants of the motor, or the error of a sensor utilizing the torque ripple of the compressor.

In a fifteenth aspect of the present invention, a motor controlling method adjusts the instrument constants so as to determine a torque ripple ratio with respect to an average torque to be a predetermined value, the average torque being observed from a section which calculates information for a rotor position using the current and voltage applied to the motor and the instrument constants of the motor.

In a sixteenth aspect of the present invention, a motor controlling method employs a value determined in correspondence with at least the rotation speed, torque, or current, as the determined value for the torque ripple ratio.

In a seventeenth aspect of the present invention, a motor controlling apparatus controls a voltage or current applied to a motor driving periodical load so as to suppress rotation speed changing of the motor, the apparatus comprises:

Control means for detecting at least a fundamental wave component of an angular acceleration; and controlling the voltage or current applied to the motor so as to determine a phase of a fundamental wave component of output torque changing to be nearly reversed phase with respect to the phase of the fundamental wave component of the detected angular acceleration.

In an eighteenth aspect of the present invention, a motor controlling apparatus employs means for controlling amplitude of the output torque changing so that the fundamental wave component of the angular acceleration becomes 0, as the control means.

In a nineteenth aspect of the present invention, a motor controlling apparatus employs means employing a value consisting of a sum of a direct current component and a fundamental wave component, as at least one of an output voltage, output current, and torque command, as the control means.

In a twentieth aspect of the present invention, a motor controlling apparatus employs a motor driving a compressor as the motor, and employs means employing a value formed in correspondence with a torque changing waveform of the compressor as the output voltage, current, or torque command, as the control means.

In a twenty-first aspect of the present invention, a motor controlling apparatus employs a motor for driving a compressor as the motor, and employs means employing a value formed to suit a typical torque changing waveform of the compressor as the output voltage, current, or torque command, as the control means.

In a twenty-second aspect of the present invention, a motor controlling apparatus controls a voltage or current supplied to a motor from an inverter so as to suppress rotation speed changing of the motor with respect to a periodical load, wherein the apparatus employs an inverter which partially outputs negative torque from the inverter, and utilizes regeneration power during the above operation for motor driving again, as the inverter.

In a twenty-third aspect of the present invention, a motor controlling apparatus employs an inverter further carrying out compensation operation for dead time of the output voltage, as the inverter.

In a twenty-fourth aspect of the present invention, a motor controlling apparatus controls a voltage or current supplied to a motor from an inverter so as to suppress rotation speed changing of the motor with respect to a periodical load, the apparatus comprises;

Control means for controlling the voltage or current not to exceed a current maximum value of power devices of the inverter taking precedence over the suppression of rotation speed changing.

In a twenty-fifth aspect of the present invention, a motor controlling apparatus employs means for controlling the voltage or current not to exceed a current maximum value of power devices of the inverter by reducing the amplitude of the output torque changing, as the control means.

In a twenty-sixth aspect of the present invention, a motor controlling apparatus employs means for controlling the voltage or current not to exceed a current maximum value of power devices of the inverter by changing the waveform of the current, voltage or torque command into a form having a lower peak current with respect to the average current, as the control means.

In a twenty-seventh aspect of the present invention, a motor controlling apparatus employs means for carrying out the changing of the waveform by clipping the waveform of the current, voltage or torque command with a standard value, as the control means.

In a twenty-eighth aspect of the present invention, a motor controlling apparatus calculates information for a rotor position using a current and voltage applied to a motor and the instrument constants of the motor, and controls the voltage or current applied to the motor based upon the calculated information, the apparatus comprises;

Affection reduction means for reducing the affection of an error of the instrument constants of the motor, or an error of a sensor for detection of the current, voltage based upon characteristic property of load.

In a twenty-ninth aspect of the present invention, a motor controlling apparatus employs means for carrying out the reduction of the affection of the error of the instrument constants of the motor, or the error of a sensor when an ordinary load is driven, as the affection reduction means.

In a thirtieth aspect of the present invention, a motor controlling apparatus employs a compressor as the load of the motor, and employs means for reducing the affection of the error of the instrument constants of the motor, or the error of a sensor utilizing the torque ripple of the compressor, as the affection reduction means.

In a thirty-first aspect of the present invention, a motor controlling apparatus employs means for adjusting the instrument constants so as to determine a torque ripple ratio with respect to an average torque to be a predetermined value, the average torque being observed from a section which calculates information for a rotor position using the current and voltage applied to the motor and the instrument constants of the motor, as the affection reduction means.

In a thirty-second aspect of the present invention, a motor controlling apparatus employs means for employing a value determined in correspondence with at least the rotation speed, torque, or current, as the determined value for the torque ripple ratio, as the affection reduction means.

When the motor controlling method of the first aspect is employed, the method detects at least a fundamental wave component of an angular acceleration, and controls the voltage or current applied to the motor so as to determine a phase of a fundamental wave component of output torque changing to be nearly reversed phase with respect to the phase of the fundamental wave component of the detected angular acceleration when the method controls a voltage or current applied to a motor driving periodical load so as to suppress rotation speed changing of the motor. Therefore, stability can be improved and decrease in cost can be realized, when the voltage, current is controlled so as to suppress the speed changing due to load torque changing.

When the motor controlling method of the second aspect is employed, the method controls amplitude of the output torque changing so that the fundamental wave component of the angular acceleration becomes 0. Therefore, adjustment can be carried out for outputting an output torque with greater amplitude since the fundamental wave component of angular acceleration still remains when an output torque with amplitude is not obtained which is sufficient for canceling the fundamental wave component of speed changing. Thereby, an output torque becomes stable with amplitude for determining the fundamental wave component of the angular acceleration to be 0, then the operation similar to that of the first aspect is realized.

When the motor controlling method of the third aspect is employed, the method employs a value consisting of a sum of a direct current component and a fundamental wave component, as at least one of an output voltage, output current, and torque command. Therefore, the operation similar to that of the first aspect or the second aspect is realized.

When the motor controlling method of the fourth aspect is employed, the method employs a motor driving a compressor as the motor, and employs a value formed in correspondence with a torque changing waveform of the compressor as the output voltage, current, or torque command. Therefore, an accurate controlling corresponding to the torque changing is carried out, and the operation similar to that of the first aspect or the second aspect is realized.

When the motor controlling method of the fifth aspect is employed, the method employs a motor driving a compressor as the motor, and employs a value formed to suit a typical torque changing waveform of the compressor as the output voltage, current, or torque command. Therefore, accurate controlling corresponding to the torque changing can easily be carried out, and the operation similar to that of the first aspect or the second aspect is realized.

When the motor controlling method of the sixth aspect is employed, the method partially outputs negative torque from the inverter, and utilizes regeneration power during the above operation for motor driving again, when the method controls a voltage or current supplied to a motor from an inverter so as to suppress rotation speed changing of the motor with respect to a periodical load. Therefore, the flow of power for the average within one rotation becomes the flow towards the motor from the inverter so that the DC voltage does not keep rising due to the regeneration. As a result, saving power is realized by utilizing the regeneration power.

When the motor controlling method of the seventh aspect is employed, the method further carries out compensation operation for dead time of the output voltage. Therefore, voltage changing due to the dead time can be suppressed, and the operation similar to that of the sixth aspect is realized.

When the motor controlling method of the eighth aspect is employed, the method controls the voltage or current not to exceed a current maximum value of power devices of the inverter taking precedence over the suppression of rotation speed changing when the method controls a voltage or current supplied to a motor from an inverter so as to suppress rotation speed changing of the motor with respect to a periodical load. Therefore, determining the current capacity of power devices of the inverter to be greater capacity is not needed at all so that decrease in cost is realized.

When the motor controlling method of the ninth aspect is employed, the method controls the voltage or current not to exceed a current maximum value of power devices of the inverter by reducing the amplitude of the output torque changing. Therefore, the operation similar to that of the eighth aspect is realized by reducing the amplitude of the output torque changing.

When the motor controlling method of the tenth aspect is employed, the method controls the voltage or current not to exceed, a current maximum value of power devices of the inverter by changing the waveform of the current, voltage or torque command into a form having a lower peak current with respect to the average current. Therefore, the operation similar to that of the eighth aspect is realized by changing the waveform of the current, voltage or torque command into a form having a lower peak current with respect to the average current.

When the motor controlling method of the eleventh aspect is employed, the method carries out the changing of the waveform by clipping the waveform of the current, voltage or torque command with a standard value. Therefore, the operation similar to that of the tenth aspect is realized.

When the motor controlling method of the twelfth aspect is employed, the method reduces the affection of an error of the instrument constants of the motor, or an error of a sensor for detection of the current, voltage based upon characteristic property of load, when the method calculates information for a rotor position using a current and voltage applied to a motor and the instrument constants of the motor, and controls the voltage or current applied to the motor based upon the calculated information. Therefore, the accuracy in rotor position detection is improved, and the improvement in controlling of a motor is realized.

When the motor controlling method of the thirteenth aspect is employed, the method carries out the reduction of the affection of the error of the instrument constants of the motor, or the error of a sensor when an ordinary load is driven. Therefore, the reduction of the affection of the error can be realized with accuracy, and the operation similar to that of the twelfth aspect is realized.

When the motor controlling method of the fourteenth aspect is employed, the method employs a compressor as the load of the motor, and reduces the affection of the error of the instrument constants of the motor, or the error of a sensor utilizing the torque ripple of the compressor. Therefore, the operation similar to that of the twelfth aspect or the thirteenth aspect is realized based upon the torque ripple.

When the motor controlling method of the fifteenth aspect is employed, the method adjusts the instrument constants so as to determine a torque ripple ratio with respect to an average torque to be a predetermined value, the average torque being observed from a section which calculates information for a rotor position using the current and voltage applied to the motor and the instrument constants of the motor. Therefore, the operation similar to that of the fourteenth aspect is realized based upon the torque ripple ratio with respect to an average torque.

When the motor controlling method of the sixteenth aspect is employed, the method employs a value determined in correspondence with at least the rotation speed, torque, or current, as the determined value for the torque ripple ratio. Therefore, the operation similar to that of the fourteenth aspect is realized in correspondence with the outer condition.

When the motor controlling apparatus of the seventeenth aspect is employed, the apparatus detects at least a fundamental wave component of an angular acceleration and controls the voltage or current applied to the motor so as to determine a phase of a fundamental wave component of output torque changing to be nearly reversed phase with respect to the phase of the fundamental wave component of the detected angular acceleration, when the apparatus controls a voltage or current applied to a motor driving periodical load so as to suppress rotation speed changing of the motor. Therefore, stability is improved and decrease in cost is realized, when the voltage, current is controlled so as to suppress the speed changing due to load torque changing.

When the motor controlling apparatus of the eighteenth aspect is employed, the apparatus employs means for controlling amplitude of the output torque changing so that the fundamental wave component of the angular acceleration becomes 0, as the control means. Therefore, adjustment can be carried out for outputting an output torque with greater amplitude since the fundamental wave component of angular acceleration still remains when an output torque with amplitude is not obtained which is sufficient for canceling the fundamental wave component of speed changing. Thereby, an output torque becomes stable with amplitude for determining the fundamental wave component of the angular acceleration to be 0, then the operation similar to that of the seventeenth aspect is realized.

When the motor controlling apparatus of the nineteenth aspect is employed, the apparatus employs means employing a value consisting of a sum of a direct current component and a fundamental wave component, as at least one of an output voltage, output current, and torque command, as the control means. Therefore, the operation similar to that of the seventeenth aspect or the eighteenth aspect is realized.

When the motor controlling apparatus of the twentieth aspect is employed, the apparatus employs a motor driving a compressor as the motor, and employs means employing a value formed in correspondence with a torque changing waveform of the compressor as the output voltage, current, or torque command, as the control means. Therefore, an accurate controlling corresponding to the torque changing can be carried out, and the operation similar to that of the seventeenth aspect or the eighteenth aspect is realized.

When the motor controlling apparatus of the twenty-first aspect is employed, the apparatus employs a motor driving a compressor as the motor, and employs means employing a value formed to fit a typical torque changing waveform of the compressor as the output voltage, current, or torque command, as the control means. Therefore, an accurate controlling corresponding to the torque changing can easily be carried out, and the operation similar to that of the seventeenth aspect or the eighteenth aspect is realized.

When the motor controlling apparatus of the twenty-second aspect is employed, the apparatus partially outputs negative torque from the inverter, and utilizes regeneration power during the above operation for motor driving again using the inverter, when the apparatus controls a voltage or current supplied to a motor from an inverter so as to suppress rotation speed changing of the motor with respect to a periodical load. Therefore, the flow of power for the average within one rotation becomes the flow towards the motor from the inverter so that the DC voltage does not keep rising due to the regeneration. As a result, saving power is realized by utilizing the regeneration power.

When the motor controlling apparatus of the twenty-third aspect is employed, the apparatus employs an inverter further carrying out a compensation operation for dead time of the output voltage, as the inverter. Therefore, voltage changing due to the dead time can be suppressed, and the operation similar to that of the twenty-second aspect is realized.

When the motor controlling apparatus of the twenty-fourth aspect is employed, the apparatus controls the voltage or current not to exceed a current maximum value of power devices of the inverter taking precedence over the suppression of rotation speed changing, when the apparatus controls a voltage or current supplied to a motor from an inverter so as to suppress rotation speed changing of the motor with respect to a periodical load. Therefore, determining the current capacity of power devices of the inverter to be greater capacity is not needed at all so that decrease in cost is realized.

When the motor controlling apparatus of the twenty-fifth aspect is employed, the apparatus employs means for controlling the voltage or current not to exceed a current maximum value of power devices of the inverter by reducing the amplitude of the output torque changing, as the control means. Therefore, the operation similar to that of the twenty-fourth aspect is realized by reducing the amplitude of the output torque changing.

When the motor controlling apparatus of the twenty-sixth aspect is employed, the apparatus employs means for controlling the voltage or current not to exceed a current maximum value of power devices of the inverter by changing the waveform of the current, voltage or torque command into a form having a lower peak current with respect to the average current, as the control means. Therefore, the operation similar to that of the twenty-fourth aspect is realized by changing the waveform of the current, voltage or torque command into a form having a lower peak current with respect to the average current.

When the motor controlling apparatus of the twenty-seventh aspect is employed, the apparatus employs means for carrying out the changing of the waveform by clipping the waveform of the current, voltage or torque command with a standard value, as the control means. Therefore, the operation similar to that of the twenty-sixth aspect is realized.

When the motor controlling apparatus of the twenty-eighth aspect is employed, the apparatus reduces the affection of an error of the instrument constants of the motor, or an error of a sensor for detection of the current, voltage based upon characteristic property of load, using the affection reduction means, when the apparatus calculates information for a rotor position using a current and voltage applied to a motor and the instrument constants of the motor, and controls the voltage or current applied to the motor based upon the calculated information. Therefore, the accuracy in rotor position detection is improved, and the improvement in controlling of a motor is realized.

When the motor controlling apparatus of the twenty-ninth aspect is employed, the apparatus employs means for carrying out the reduction of the affection of the error of the instrument constants of the motor, or the error of a sensor when an ordinary load is driven, as the affection reduction means. Therefore, the reduction of the affection of the error is realized with accuracy, and the operation similar to that of the twenty-eighth aspect is realized.

When the motor controlling apparatus of the thirtieth aspect is employed, the apparatus employs a compressor as the load of the motor, and employs means for reducing the affection of the error of the instrument constants of the motor, or the error of a sensor utilizing the torque ripple of the compressor, as the affection reduction means. Therefore, the operation similar to that of the twenty-eighth aspect or the twenty-ninth aspect is realized based upon the torque ripple.

When the motor controlling apparatus of the thirty-first aspect is employed, the apparatus employs means for adjusting the instrument constants so as to determine a torque ripple ratio with respect to an average torque to be a predetermined value, the average torque being observed from a section which calculates information for a rotor position using the current and voltage applied to the motor and the instrument constants of the motor, as the affection reduction means. Therefore, the operation similar to that of the thirtieth aspect is realized based upon the torque ripple ratio with respect to an average torque.

When the motor controlling apparatus of the thirty-second aspect is employed, the apparatus employs means for employing a value determined in correspondence with at least the rotation speed, torque, or current, as the determined value for the torque ripple ratio, as the affection reduction means. Therefore, the operation similar to that of the thirtieth aspect is realized in correspondence with the outer condition. Description is made further.

In the rotor position detection system in recent years for detecting a rotor position without using a rotary encoder or the like, it becomes possible that angular speed changing of a motor is calculated because an angle outputting with accuracy is possible. With utilizing this;

1. Control with more accuracy can be made possible by suppressing the speed changing by performing feedback of the angular acceleration;
2. Stability can be improved by performing feedback with the gain of infinity after the extraction of the fundamental wave component;
3. The current peak can be reduced by weakening vibration suppression control when load is heavy, so that decrease in cost of motor inverter can be realized;
4. The phase error can be made to be 0 even when gain is finite by taking the fact into consideration that the angular acceleration changing has a phase which is the same to that of the load torque changing.

The present invention was completed based upon those knowledge.

BEST MODE FOR CARRYING OUT THE PRESENT INVENTION

Hereinafter, referring to the attached drawings, we explain a motor controlling method and apparatus thereof of an embodiment according to the present invention in detail.

Figure 1:
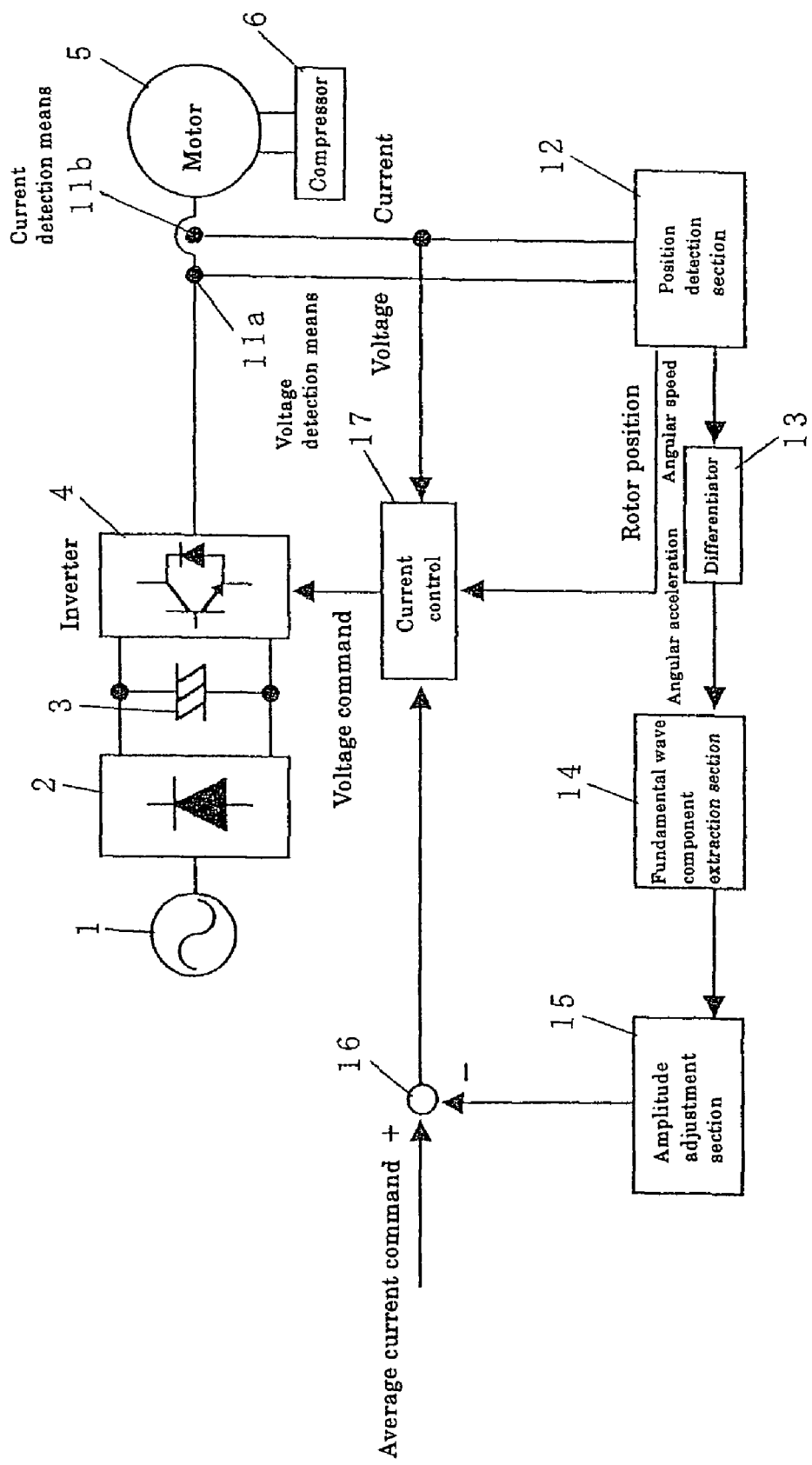
FIG. 1 is a block diagram illustrating a motor controlling apparatus of an embodiment according to the present invention.

FIG. 1 is a block diagram illustrating a motor controlling apparatus of an embodiment according to the present invention.

In this motor controlling apparatus, a first AC power 1 is supplied to a converter 2 so that a DC power is obtained. The DC power is smoothened by a smoothing condenser 3. The smoothened DC power is converted into a second AC power by an inverter 4. The second AC power is supplied to a motor 5. And, a compressor 6 is driven by this motor 5.

A voltage and current supplied to the motor 5 are detected by a voltage detection section 11a and a current detection section 11b, and are supplied to a position detection section 12. An angular speed output from this position detection section 12 is supplied to a differentiator 13 so that an angular acceleration is output, fundamental wave component of the angular acceleration is extracted by a fundamental wave component extraction section 14, and the fundamental wave component is supplied to an amplitude adjustment section 15. The output from the amplitude adjustment section 15 is subtracted from an average current command by a subtraction section 16. This subtraction result, current detection value, and rotor position from the position detection section 12 are supplied to a current controlling section 17 so that current controlling operation is carried out so as to obtain a current command. The current command is supplied to the inverter 4.

The compressor 6 has periodic load change by about once or twice per one rotation.

The position detection section 12 calculates a rotation position and rotation angular acceleration of a rotor using the voltage, current of the motor 5, and the instrument constants such as flux of the magnet, d-axis and q-axis inductances (Ld, Lq), and the like.

The differentiator 13 differentiates the angular speed so as to calculate the angular acceleration.

The fundamental wave component extraction section 14 extracts the fundamental wave component of the angular acceleration. Therefore, as the output of the fundamental wave component extraction section 14, angular acceleration change of a frequency which is the same to the motor rotation number is extracted and output when the load changing of the compressor 6 is once for one rotation of the motor, while angular acceleration change of a frequency which is twice the motor rotation number is extracted and output when the load changing of the compressor 6 is twice for one rotation of the motor.

The amplitude adjustment section 15 amplifies the fundamental wave component of the angular acceleration and outputs the amplification result. Wherein, the amplification degree is set to be infinity in the amplitude adjustment section 15 by integrating the amplitude of ordinary fundamental wave component and so on.

Figure 2:
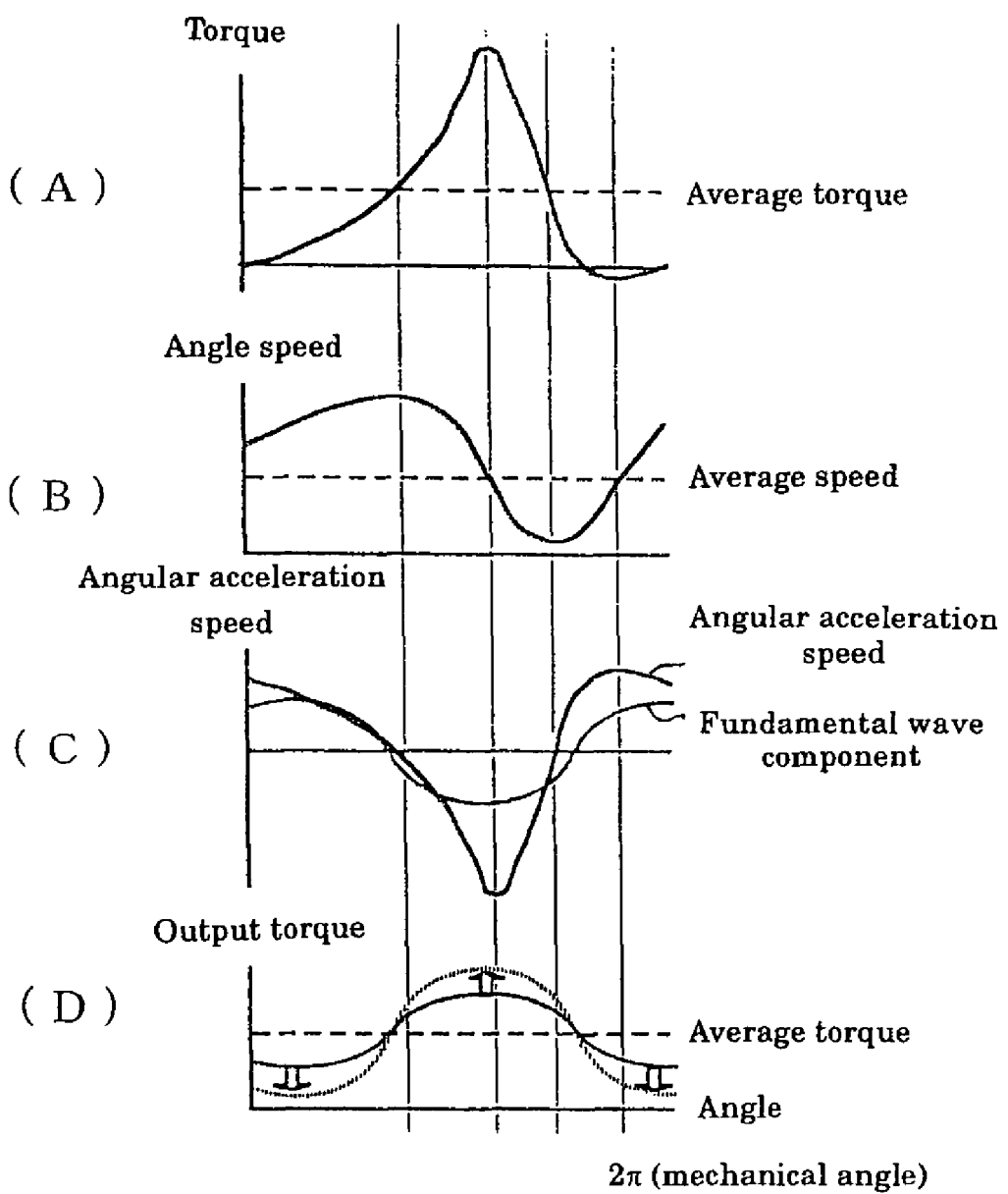
FIG. 2 is a diagram showing waveforms for each section.

Description is made further with reference to FIG. 2. (A) in FIG. 2 illustrates an axial torque of a compressor with one cylinder, (B) in FIG. 2 illustrates a motor angular speed when it is driven with an average torque, (C) bin FIG. 2 illustrates a motor angular acceleration, (D) in FIG. 2 illustrates a motor output torque when the controlling of FIG. 1 is carried out, respectively. In FIG. 2, the horizontal axis represents a rotation angle (mechanical angle) of a rotor.

When the motor is driven with an average torque {refer to dashed lines of (A)(D) in FIG. 2), and when the axial torque of the compressor is greater than the average torque, the motor is reduced speed. On the contrary, when the axial torque of the compressor is smaller than the average torque, the motor is increased speed. Therefore, the angular acceleration will have a shape which is reverse in up and down to the shape of the compression torque, and the fundamental wave component of the angular acceleration will have a shape which is illustrated in (C) in FIG. 2. Consequently, by changing the output torque of the motor in reversed phase with respect to the fundamental wave component of the angular acceleration, the fundamental wave component of the speed changing can be reduced. When sufficient amplitude for negating the fundamental wave component of the speed changing is not obtained for the motor output torque as illustrated in (D) in FIG. 2, the fundamental wave component of the angular acceleration still remains. Therefore, the adjustment is carried out in the amplitude adjustment section so as to output greater amplitude. As a result, stability is realized at amplitude where the fundamental wave component of the angular acceleration becomes 0.

Even when the phase of the output torque and the phase of the angular acceleration are shifted from one the other to some degree due to the delay of any sections, the fundamental wave component of the angular acceleration is controlled to be 0 finally, because fundamental wave component of an angular acceleration due to residual torque of the compressor axial torque and the motor output torque is detected and controlling is carried out for negating the detected fundamental wave component.

The fundamental wave number component of the speed changing can be reduced by such controlling, therefore vibration is effectively reduced.

In the embodiment of FIG. 1, the fundamental wave component is overlapped to the current command, however it is possible that the fundamental wave component is directly overlapped to the voltage command for the controlling having no current controlling, because slight shifting in phase and the like can be neglected by feedback controlling as described above. Of course, it is effective that the fundamental wave component is overlapped to the torque command for the controlling having the torque command internally.

This controlling reduces only the fundamental wave component, therefore delay in controlling and the like is hardly affected. Consequently, stable controlling can be realized in comparison with the repetitive controlling known conventionally. When the compressor or the like is driven, sufficient vibration suppression effect can be obtained only by the reduction of the fundamental wave component.

In the above description only the fundamental wave component is targeted. However, it is apparent that higher order angular acceleration component such as second order may be extracted in addition to the fundamental wave component and the controlling may be carried out for negating the torque changing. In this case, disadvantages arise in that the controlling becomes complicated and that possibility in diverging may be increased, on the other hand vibration suppressing ability is not improved too much. Therefore, the higher order component for the controlling target should be selected based upon the tradeoff with the requirement specification.

Figure 3:
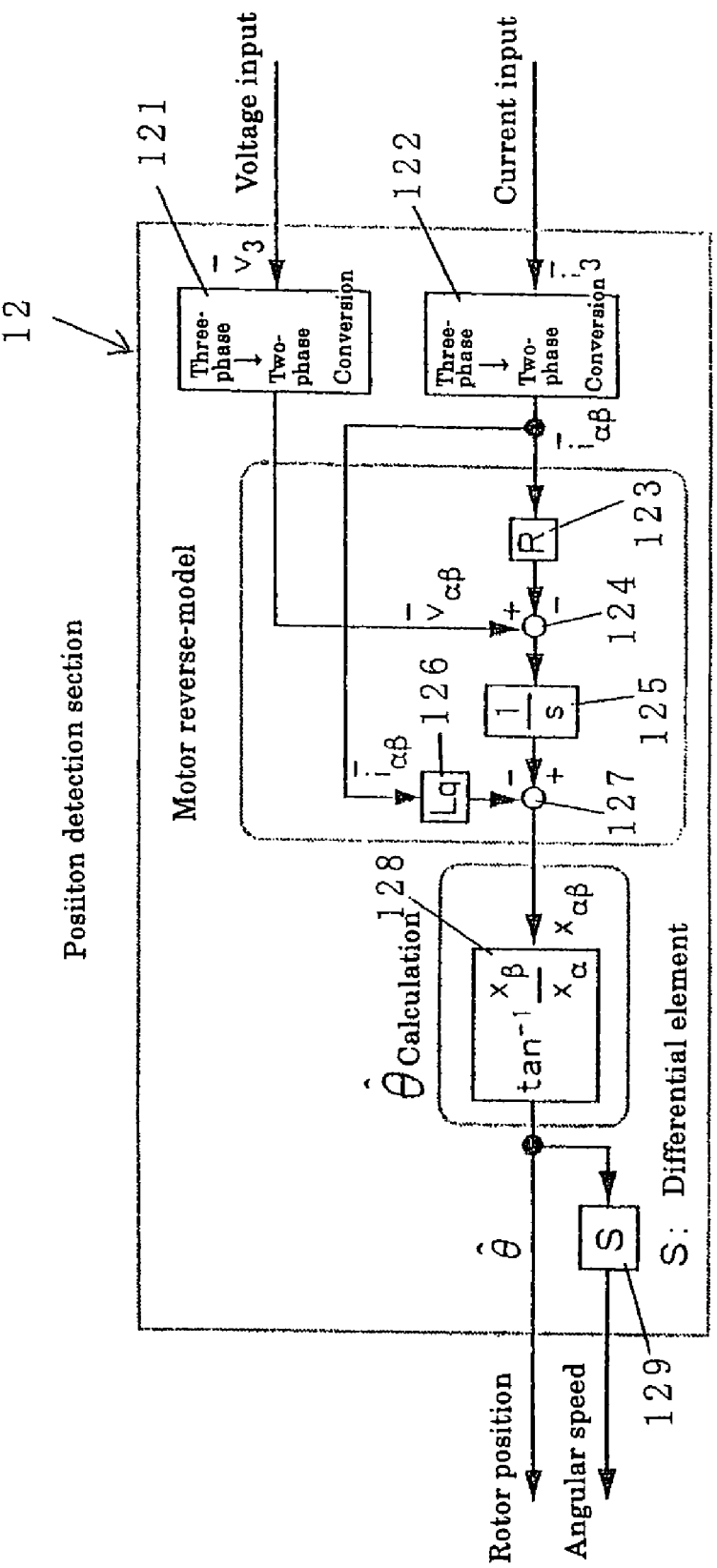
FIG. 3 is a block diagram illustrating a position detection section of an example.

FIG. 3 is a block diagram of the position detection section of an example. The position detection section comprises a first conversion section 121 which receives the detected voltages for three phases and converts the detected voltages for three phases into voltages for two phases; a second conversion section 122 which receives the detected currents for three phases and converts the detected currents for three phases into currents for two phases; a voltage drop calculation section 123 for calculating a voltage drop due to a winding resistance R; a first subtraction section 124 for subtracting the calculated voltage drop from the voltages for two phases; an integration section 125 for integrating the subtraction result from the first subtraction section 124; a flux calculation section 126 for calculating a flux due to the q-axis inductance Lq; a second subtraction section 127 for subtracting the calculated flux from the integration result; a rotor position calculation section 128 for calculating a rotor position based upon the subtraction result from the second subtraction section 127; and a differential section 129 for calculating an angular speed by differentiating the rotor position.

A position detection section having another arrangement can also be employed.

Figure 4:
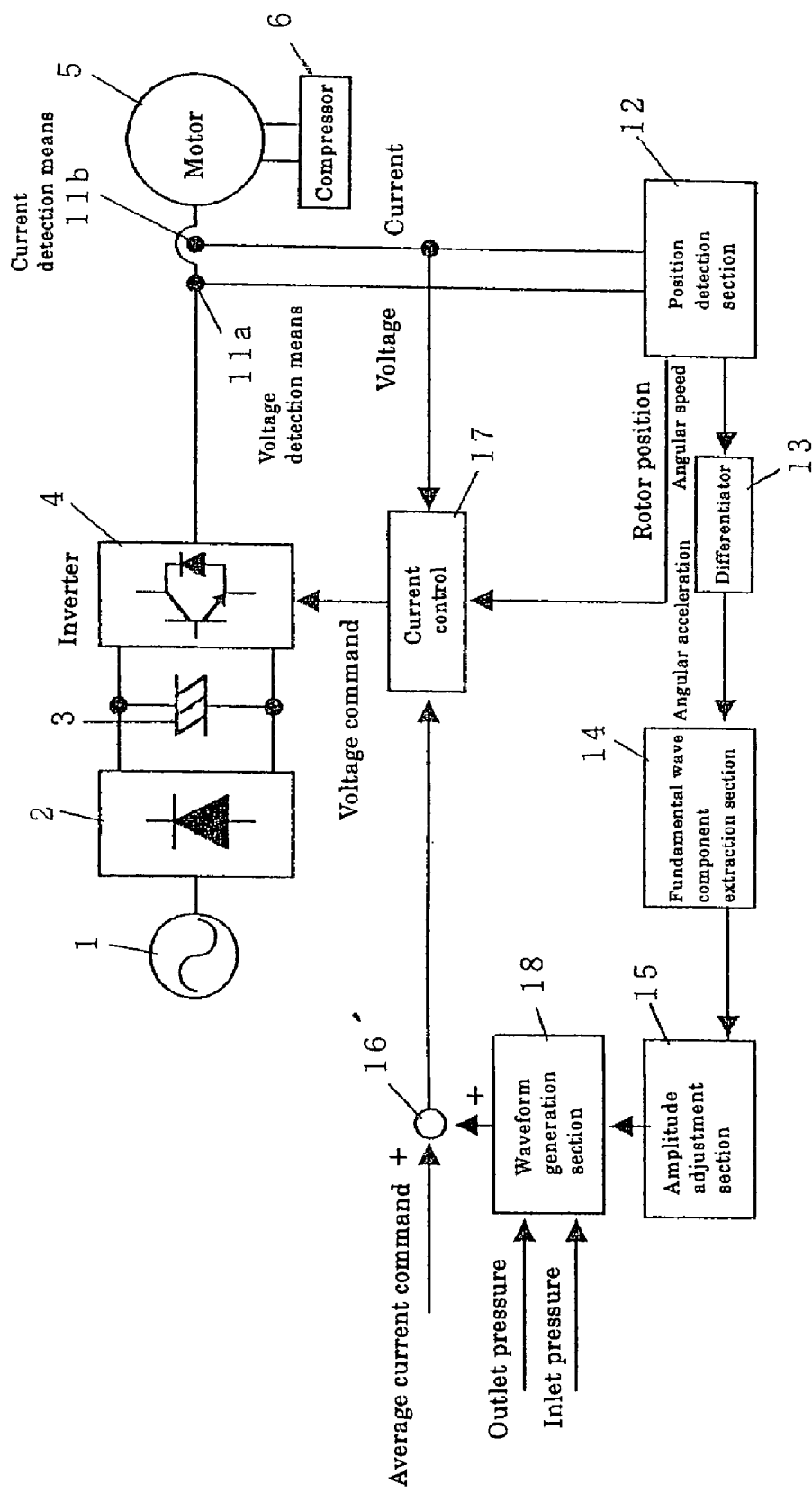
FIG. 4 is a block diagram illustrating a motor controlling apparatus of another embodiment according to the present invention.

FIG. 4 is a block diagram of a motor controlling apparatus of another embodiment according to the present invention.

This motor controlling apparatus is different from the motor controlling apparatus of FIG. 1 only in that an addition section 16' is employed instead the subtraction section 16, and a waveform generation section 18 is provided between the amplitude adjustment section 15 and the addition section 16'.

The waveform generation section 18 is previously set torque waveforms and a phase of a fundamental wave of each torque waveform for each of outlet pressure, inlet pressure of the compressor. The waveform generation section 18 outputs a torque waveform based upon instantaneous outlet pressure, inlet pressure, and the waveform of the fundamental wave component from the amplitude adjustment section 15 so that a phase of the fundamental wave component of the output waveform becomes a phase which is reversed the phase from the amplitude adjustment section 15 and that amplitude of the fundamental wave component of the output waveform becomes the amplitude from the amplitude adjustment section 15. This can readily be realized by data are held in the waveform generation section 18 for forms which are the same in phase and amplitude of the fundamental wave component for each waveform, and by reading out the held data while amplifying the held data for matching the input phase, amplitude.

Figure 5:
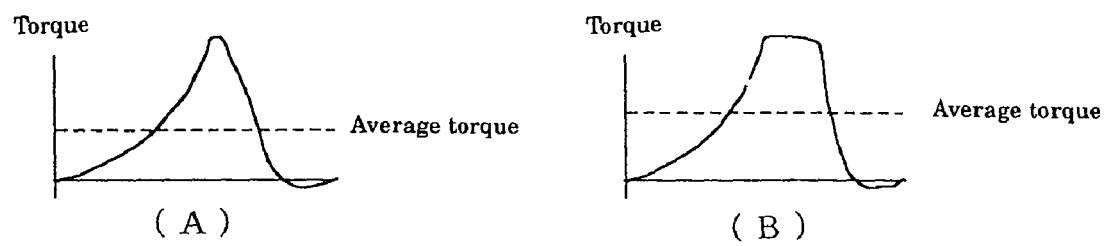
FIG. 5 is a diagram illustrating a change in compressor load changing for one rotation of the compressor.

FIG. 5 is a diagram illustrating a change of compressor load changing for one rotation of a compressor.

A graph (A) in FIG. 5 illustrates torque changing for a case that an inlet pressure is low and that an interior pressure is hardly raised. A graph (B) in FIG. 5 illustrates torque changing for a case that an inlet pressure is high and that an interior pressure is rapidly raised. Both schematically illustrate cases that outlet pressures are nearly the same to one another.

The inlet pressure, outlet pressure can be estimated by a condensation temperature, evaporation temperature for a compressor used for an air conditioner. Therefore, accurate controlling can be realized by controlling an output torque pattern using those pressures.

Figure 6:
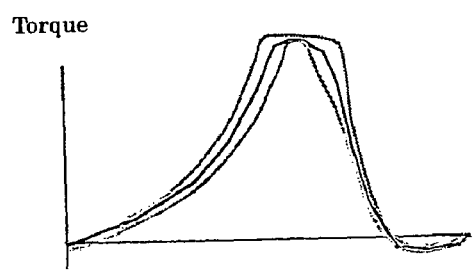
FIG. 6 is a diagram useful in understanding a typical torque waveform of a compressor.

However, amount of necessary waveform data becomes extremely great for this case. To dissolve this disadvantage, the amount of data can be reduced by obtaining a typical torque waveform of a compressor as an average for each point of a waveform like (A) (B) in FIG. 5, as illustrated in FIG. 6. Also, the arrangement can be simplified by making inputting of the outlet pressure, inlet pressure unnecessary.

Figure 7:
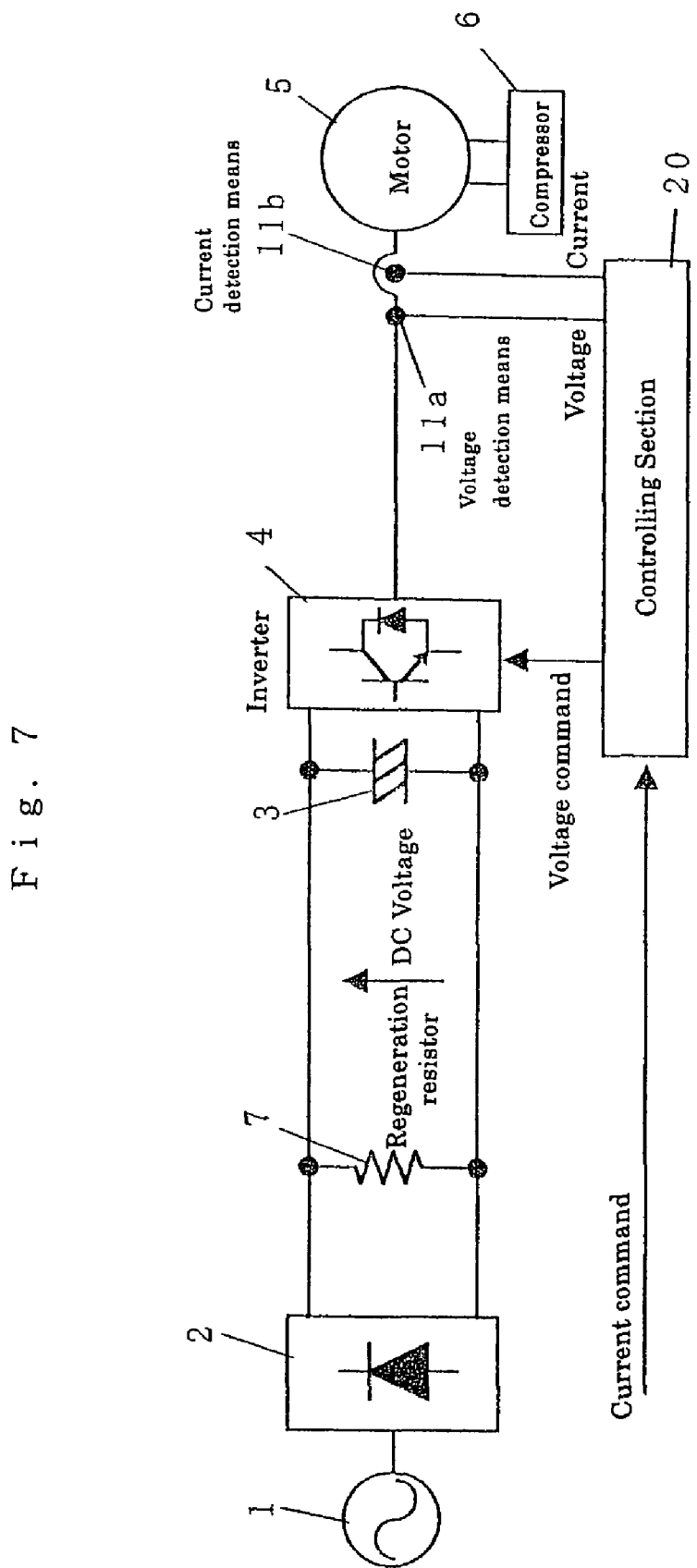
FIG. 7 is a block diagram illustrating a motor controlling apparatus of a further embodiment according to the present invention.

FIG. 7 is an electric circuitry diagram illustrating a main section of a motor controlling apparatus of a further embodiment according to the present invention. This motor controlling apparatus supplies AC power 1 to a converter 2 so as to obtain DC power, smoothens the DC power with a smoothing condenser 3, converts the smoothened DC power into another AC power with an inverter 4, and supplies the AC power to a motor 5. And, a compressor 6 is driven by the motor 5. Further, a regeneration resistor 7 is connected between output terminals of the converter 2.

The motor controlling apparatus further comprises a controlling section 20 which receives the voltage, current supplied to the motor 5 and the current command as input, generates a voltage command, and supplies the voltage command to the inverter 4. The regeneration resistor 7 has an extremely great resistance value. The controlling section 20 has an arrangement illustrated in FIG. 1, FIG. 4, for example.

In usual, and in an inverter possibly generates regeneration, a regeneration resistor is provided for consuming regeneration power so that a disadvantage is prevented from occurrence that a condenser and inverter element are destroyed by the DC voltage which becomes an exceeding voltage due to the regeneration power from the motor. Further, an arrangement may be employed that a switch is provided in series to the regeneration resistor for saving energy so as to connect the regeneration resistor only when the regeneration operation is carried out.

On the other hand, when regeneration operation is partially carried out for reducing rotation speed change following periodic load change, flow of power averaged for one rotation is in the direction from the inverter to the motor so that it is not true that the DC voltage is kept rising due to the regeneration. Therefore, the inverter can be kept driven without energy consumption due to the regeneration resistor by properly selecting the capacity of the condenser provided at the input of the inverter. So, the regeneration power is used again for motor driving so as to realize the saving of power by selecting the regeneration resistor 7 to be very great (so as to make the consumption energy to be very small) or by providing no regeneration resistor.

Figure 8:
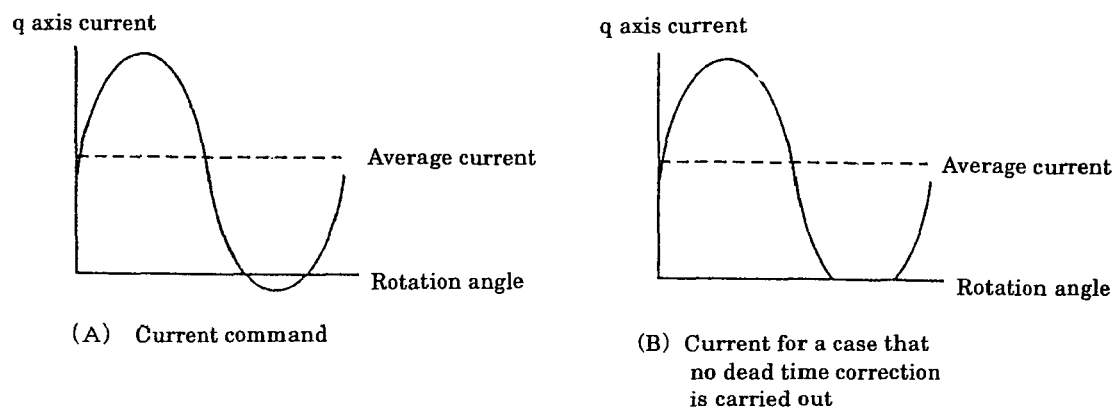
FIG. 8 is a diagram illustrating a waveform when a negative torque is output.

FIG. 8 is a diagram illustrating a waveform when a negative torque is output. A current command {refer to (A) in FIG. 8} and output current {refer to (B) in FIG. 8} for a case that no dead time correction is carried out are illustrated. In FIG. 8, a current (q-axis current) on a rotating coordinate system which is determined its axis in q-axis direction which is the same direction to the direction of the induced voltage vector. When the current command is determined to be a current command of (A) in FIG. 8, and when no dead time correction is carried out, a voltage becomes not to be applied due to the affection of the dead time as the current command becomes smaller. Consequently, the waveform of (B) in FIG. 8 is observed which has obtained by clipping the command current in the vicinity of the current of 0. When the arrangement having a current controlling section is employed (refer to FIG. 1, FIG. 4 and the like, for example), a current is properly controlled based upon a difference between the current command and real current so that affection of the dead time can be ignored for slow changing. However, for rapid changing such as about once or twice within one rotation, sufficient gain cannot be obtained so that the waveform becomes a waveform like (B) in FIG. 8. When this has happened, the controlling section for canceling rotation speed changing due to periodic load changing may become instable. Therefore, it is preferable that the dead time correction is carried out when the outputting is carried out.

Figure 9:
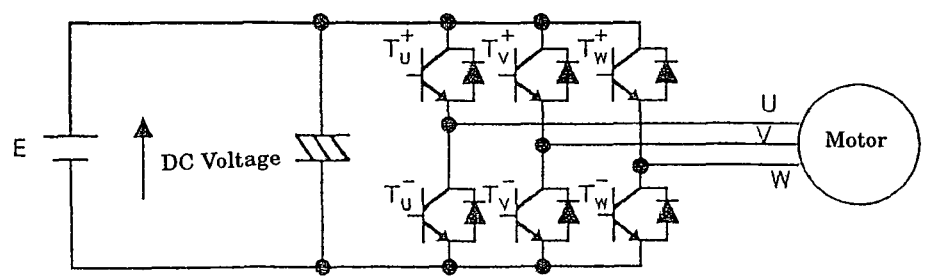
FIG. 9 is a diagram illustrating detailed arrangement of an inverter.

FIG. 9 is a diagram illustrating a detailed arrangement of the inverter. An inverter of three phases is illustrated in FIG. 9. The dead time is used for carrying out controlling so as to turning the input of Tu− on a dead time interval after the turning the input of Tu+ on so that Tu+, Tu− for carrying out switching for u-phase never turning on simultaneously, for example. Therefore, when there exist a dead time, an interval will be made, two transistors being turned off for this interval. However, a diode connected in parallel with Tu− is turned on, if the current is flowing towards the motor for the interval, for example. Consequently, a result is obtained which is the same to that of the result for a case that Tu− is turned on. On the contrary, if the current flows from the motor towards the inverter, a diode connected in parallel with Tu+ is turned on. Thereby, the output voltage seems to be changed in its appearance. So, the change in voltage due to the dead time can be suppressed by lengthening the interval for connecting to + when the current flows towards the motor and when PWM is output, and by lengthening the interval for connecting to − when the current flows from the motor.

Figure 10:
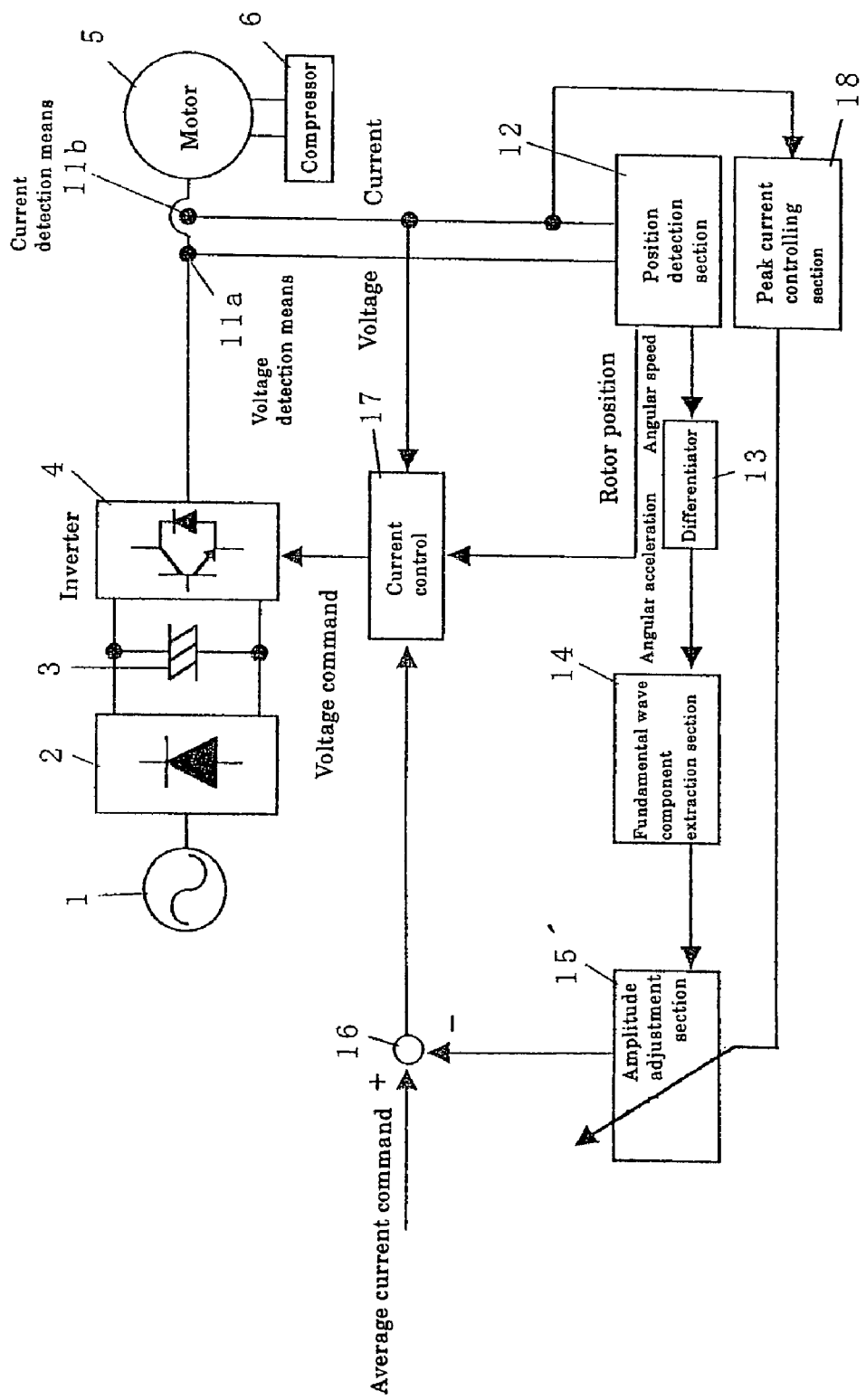
FIG. 10 is a block diagram illustrating a motor controlling apparatus of a further embodiment according to the present invention.

FIG. 10 is a block diagram illustrating a motor controlling apparatus of a further embodiment according to the present invention.

This motor controlling apparatus is different from the motor controlling apparatus of FIG. 1 only in that a peak current controlling section 18 is further provided which receives the detection current, and that an amplitude adjustment section 15' controlled based upon the output from the peak current controlling section 18, is employed instead the amplitude adjustment section 15.

The peak current controlling section 18 detects a peak value of the motor current, and outputs a command for suppressing amplitude when it is expected that the peak value exceeds a value which is previously determined by taking the limited current of the inverter or motor into consideration.

The amplitude adjustment section 15' receives an amplitude suppression command, and carries out processing for lowering the gain by removing a value of a certain percentage from the integration value instead the realizing the gain of infinite conventionally by the integration and the like so that the fundamental wave component of the angular acceleration becomes 0.

Therefore, the fundamental wave component of the angular acceleration never become 0, but it becomes possible that the peak current is reduced because the amplitude of the current command becomes smaller, and that the motor is kept to be driven with a current which is lower than or equal to the limiting current of the inverter device or motor.

In other words, inverter devices or motor with small current capacity can be used so that decreasing in cost can be realized.

Figure 11:
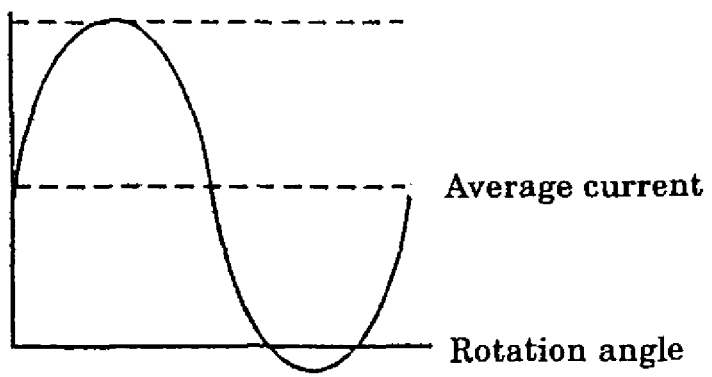
FIG. 11 is a diagram illustrating current commands for prior to and after clipping.
Figure 11:
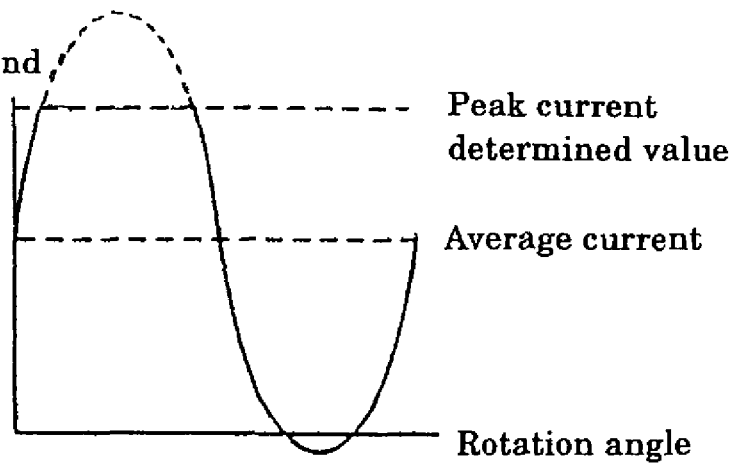

FIG. 11 is a diagram illustrating current commands prior to and after the clipping. A current command waveform prior to the clipping is illustrated as (A) in FIG. 11, and a current command waveform after the clipping is illustrated as (B) in FIG. 11, respectively. This waveform is a waveform which is obtained by applying a signal for removing periodic torque changing to the current command. The processing for obtaining the current command deformed into a form with lower peak current obtained by clipping can be realized in the amplitude adjustment section, for example.

When the waveform of (A) in FIG. 11 becomes further greater and reaches the peak current determined value, the peak current is reduced by clipping the current command. For this case, the average torque is lowered and the speed is lowered when the average current is kept as it is. Therefore, it becomes possible that the peak current is reduces while the average speed is maintained by increasing the average current command value using the speed controlling loop and the like and by carrying out clipping further. In this case, a fundamental wave component can be output greater in equivalence than that in the above case that the amplitude is adjusted, thereby the torque changing amount for realizing the fundamental wave component of 0 while keeping the peak current can be enlarged.

Figure 12:
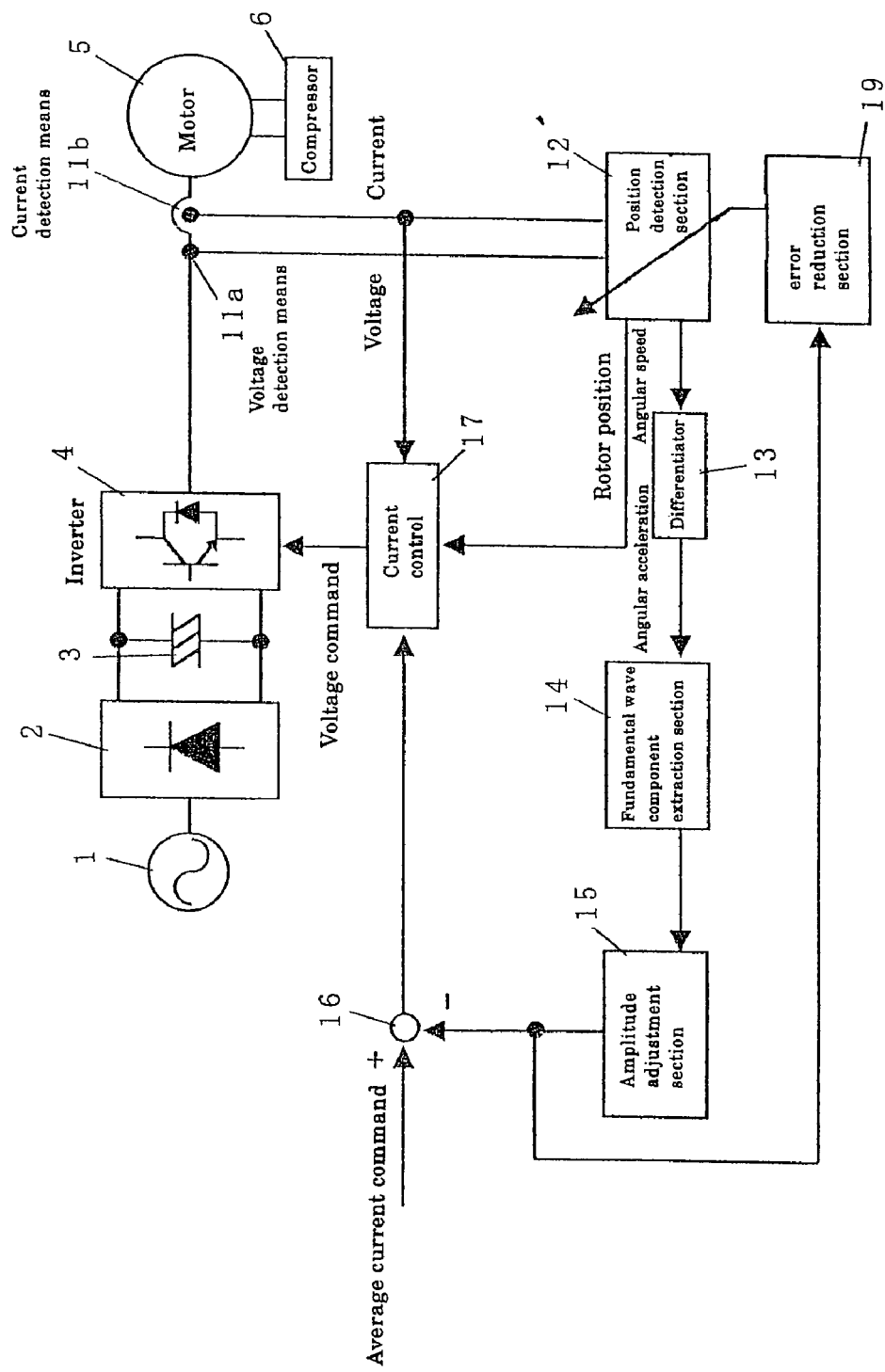
FIG. 12 is a block diagram illustrating a motor controlling apparatus of a further embodiment according to the present invention.

FIG. 12 is a block diagram illustrating a motor controlling apparatus of a further embodiment according to the present invention.

This motor controlling apparatus is different from the motor controlling apparatus of FIG. 1 only in that an error reduction section 19b is further provided which receives the output from the amplitude adjustment section 15, and that a position detection section 12' controlled based upon the output from the error reduction section 19, is employed instead the position detection section 12.

The error reduction section 19 has a previously determined magnitude of a torque changing amount of the compressor, and compares the torque changing amount output with this determined value so as to output a Lq correction command, for example. The position detection section 12' corrects Lq in response to the Lq correction command, and outputs a rotor position, angular speed using the corrected Lq, for example.

Figure 13:
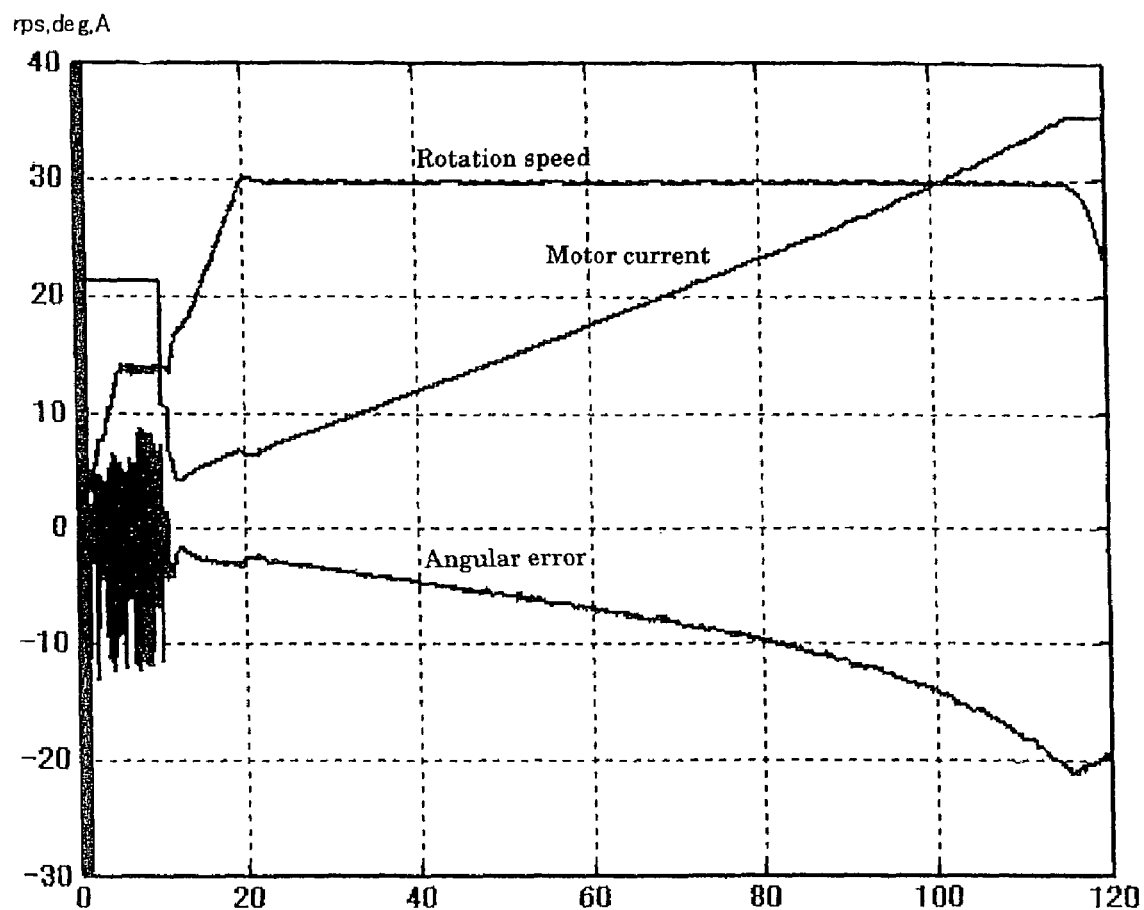
FIG. 13 is a diagram illustrating changing in angular error when q-axis inductance Lq of the motor 5 in the position detection section 12 in FIG. 3 is smaller by 10% than Lq set for the position detection section 12.
Figure 14:
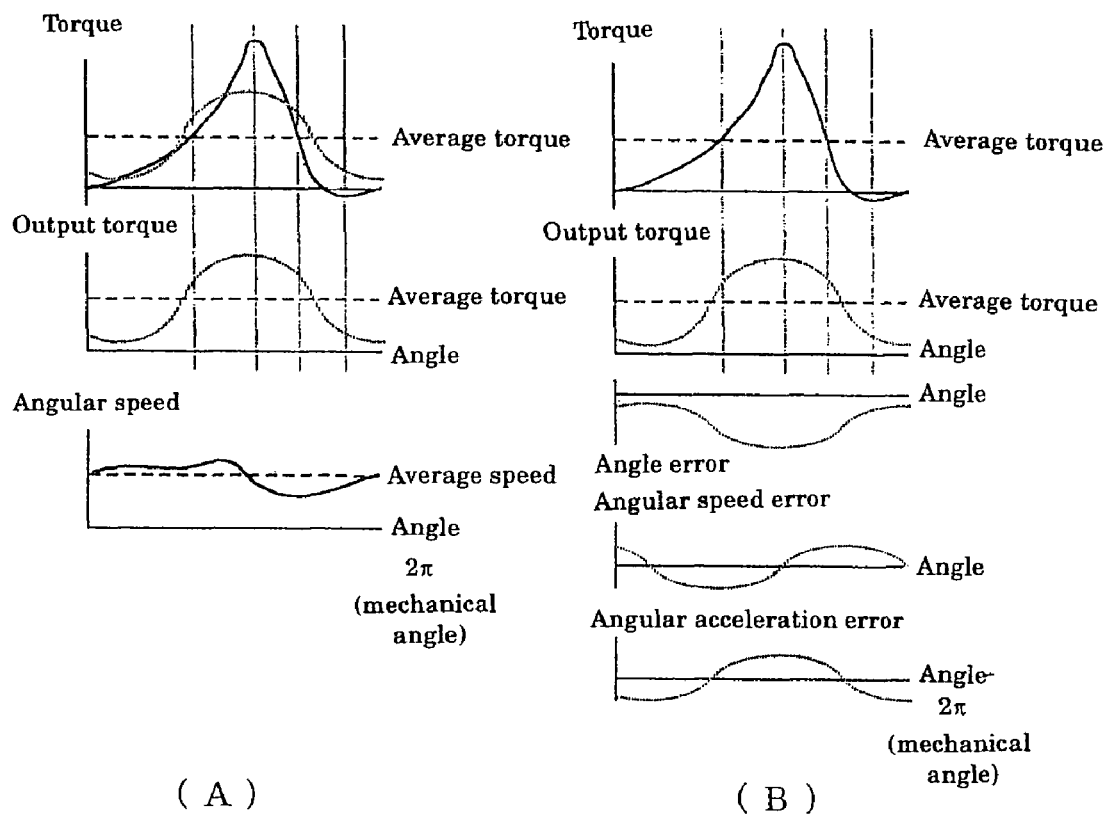
FIG. 14 is a diagram illustrating schematic waveforms of each section when a compressor having repetitive torque change for every one rotation is driven using a position detection section and by shifting an output torque to suit load change.

FIG. 13 is a diagram illustrating changing in angular error for a case that the q-axis inductance Lq of the motor 5 is smaller by 10% than Lq determined in the position detection section 12, in the position detection section 12 of FIG. 3. In this figure, a case is illustrated that load is gradually increased following passage of time. As is understood from this figure, an estimated angle is delaying following the increase of load. FIG. 14 illustrates schematic waveforms of each section when the compressor 6 having repetitive torque changing for every one rotation is driven by changing the output torque to suit the load changing using this position detection section 12. When there are no error, the output torque is increased following the increase in load torque so that the rotation speed changes not too great and that a regular rotation can be maintained {refer to (A) in FIG. 14}. However, when Ld is small, the position detection section 12 generates an error in minus direction following the increase in output torque so that the angular acceleration error of a phase which is the same to that of the output torque and that the angular acceleration is observed to be great for a section where torque is great {refer to (B) in FIG. 14}. And, the torque changing is carried out which is smaller than the actual necessary torque because the torque controlling is carried out based upon this information.

On the other hand, the torque changing amount of the compressor 6 is determined approximately by the construction of the compressor 6. Therefore, it is understood that Lq set in the position detection section 12 is smaller than Lq of an actual motor when the torque changing amount of the compressor 6 and magnitude of the torque changing output from the controlling are compared with one another and when the torque changing amount output from the controlling is smaller.

Therefore, the Lq correction command is output by comparing both torque changing amounts in the error reduction section 19 in FIG. 12, and correction of Lq in the position detection section 12' can be realized.

Only the error reduction in Lq has been described here, however similar operation is carried out for the position detection section in FIG. 3, for example, when error exists in other instrument constants, gains of the current detector and voltage detector, therefore error reduction for those can be carried out with similar manner. When error is generated in multiple parameters, respective error cannot be reduced. However, the position detection error generated as a result of those can be reduced by adjusting Lq, for example.

Even when a position detection section is employed other than that of FIG. 3, there usually are correlation between a sign of a position detection error generated in response to output torque and a sign of error of a parameter. Therefore, the error of the parameter can be reduced using the correlation.

Figure 15:
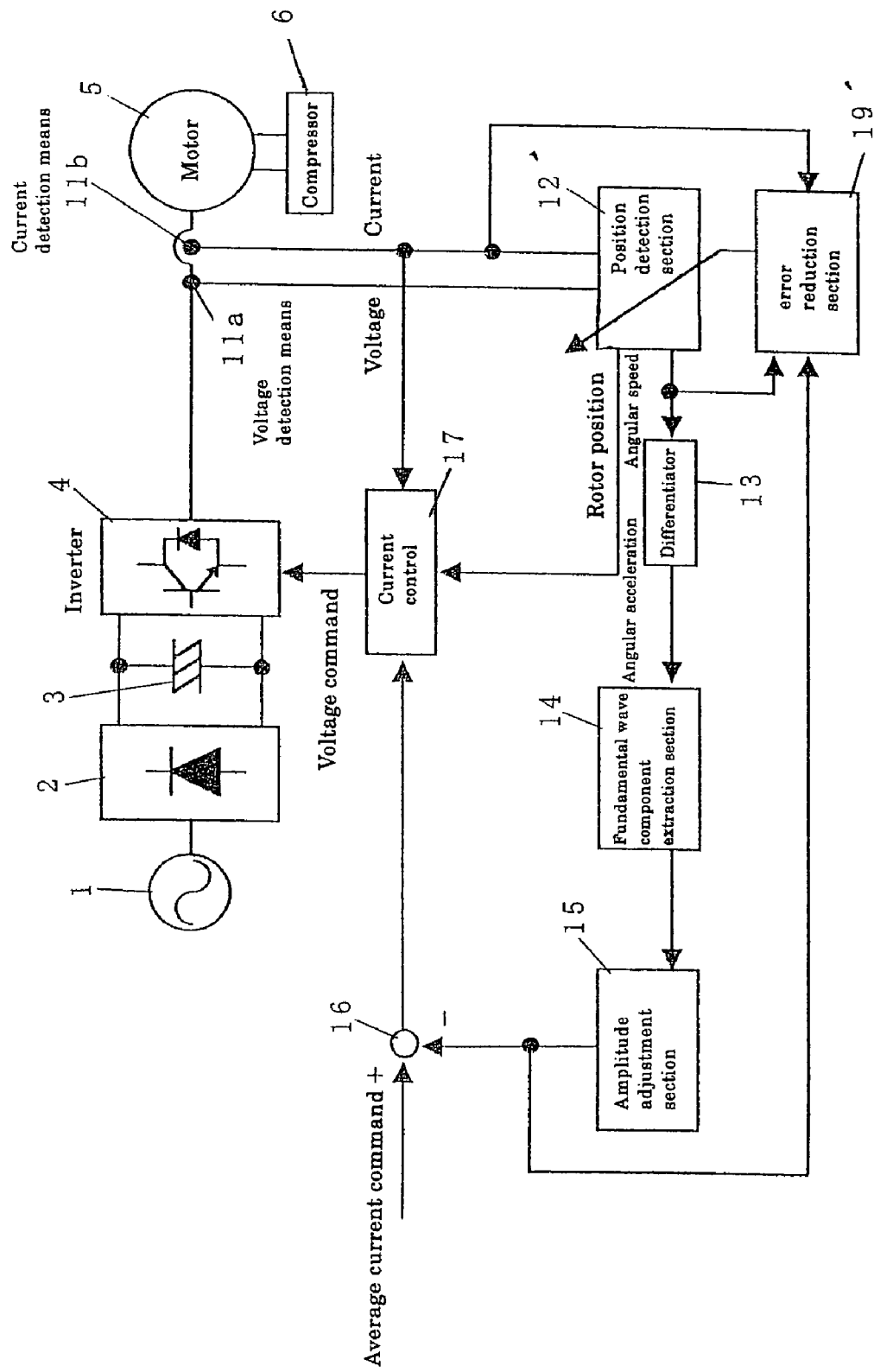
FIG. 15 is a block diagram illustrating a motor controlling apparatus of a further embodiment according to the present invention.

FIG. 15 is a block diagram of a motor controlling apparatus of a further embodiment according to the present invention.

This motor controlling apparatus is different from the motor controlling apparatus only in that an error reduction section 19' receiving the output from the amplitude adjustment section 15, the detected current, and the angular speed is employed instead the error reduction section 19.

The error reduction section 19' is previously set most proper torque changing ratio in response to the angular speed, current, and outputs a parameter adjustment command so as to make a torque changing ratio to be the torque changing ratio set in response to the angular speed, current.

The load changing of the compressor 6 is determined almost due to the construction of the compressor. However, the load changing of the compressor 6 is changed depending upon the exterior condition, as illustrated in FIG. 5. Reduction of the position detection error with accuracy can be carried out, accordingly, by changing the load changing ratio using the information such as current, angular speed. That is, the position detection error can be reduced and the speed changing can be prevented from occurrence by adjusting parameter of the position detection section 12' so as to make a torque changing ratio to be the torque changing ratio set to the angular speed, current.

The invention of the first aspect has a characteristic effect such that stability is improved and decrease in cost is realized, when the voltage, current is controlled so as to suppress the speed changing due to load torque changing.

The invention of the second aspect has a characteristic effect such that adjustment is carried out for outputting an output torque with greater amplitude since the fundamental wave component of angular acceleration still remains when an output torque with amplitude is not obtained which is sufficient for canceling the fundamental wave component of speed changing, and that an output torque becomes stable with amplitude for determining the fundamental wave component of the angular acceleration to be 0, then the effect similar to that of the first aspect is realized.

The invention of the third aspect has the effect similar to that of the first aspect or the second aspect.

The invention of the fourth aspect has a characteristic effect such that accurate controlling corresponding to the torque changing can be carried out, and has the effect similar to that of the first aspect or the second aspect.

The invention of the fifth aspect has a characteristic effect such that an accurate controlling corresponding to the torque changing can easily be carried out, and has the effect similar to that of the first aspect or the second aspect.

The invention of the sixth aspect has a characteristic effect such that the flow of power for the average within one rotation becomes the flow towards the motor from the inverter so that the DC voltage does not keep rising due to the regeneration, and that saving power is realized by utilizing the regeneration power as a result.

The invention of the seventh aspect has a characteristic effect such that voltage changing due to the dead time can be suppressed, and has the effect similar to that of the sixth aspect.

The invention of the eighth aspect has a characteristic effect such that determining the current capacity of power devices of the inverter to be greater capacity is not needed at all so that decrease in cost is realized.

The invention of the ninth aspect has the effect similar to that of the eighth aspect by reducing the amplitude of the output torque changing.

The invention of the tenth aspect has the effect similar to that of the eighth aspect by changing the waveform of the current, voltage or torque command into a form having a lower peak current with respect to the average current.

The invention of the eleventh aspect has the effect similar to that of the tenth aspect.

The invention of the twelfth aspect has a characteristic effect such that the accuracy in rotor position detection is improved, and the improvement in controlling of a motor is realized.

The invention of the thirteenth aspect has a characteristic effect such that the reduction of the affection of the error is realized with accuracy, and has the effect similar to that of the twelfth aspect.

The invention of the fourteenth aspect has the effect similar to that of the twelfth aspect or the thirteenth aspect based upon the torque ripple.

The invention of the fifteenth aspect has the effect similar to that of the fourteenth aspect based upon the torque ripple ratio with respect to an average torque.

The invention of the sixteenth aspect has the effect similar to that of the fourteenth aspect in correspondence with the outer condition.

The invention of the seventeenth aspect has a characteristic effect such that stability is improved and decrease in cost is realized, when the voltage, current is controlled so as to suppress the speed changing due to load torque changing.

The invention of the eighteenth aspect has a characteristic effect such that adjustment can be carried out for outputting an output torque with greater amplitude since the fundamental wave component of angular acceleration still remains when an output torque with amplitude is not obtained which is sufficient for canceling the fundamental wave component of speed changing, and that an output torque becomes stable with amplitude for determining the fundamental wave component of the angular acceleration to be 0 so that the effect similar to that of the seventeenth aspect is realized.

The invention of the nineteenth aspect has the effect similar to that of the seventeenth aspect or the eighteenth aspect.

The invention of the twentieth aspect has a characteristic effect such that an accurate controlling corresponding to the torque changing is carried out, and has the effect similar to that of the seventeenth aspect or the eighteenth aspect.

The invention of the twenty-first aspect has a characteristic effect such that an accurate controlling corresponding to the torque changing is easily carried out, and has the effect similar to that of the seventeenth aspect or the eighteenth aspect.

The invention of the twenty-second aspect has a characteristic effect such that the flow of power for the average within one rotation becomes the flow towards the motor from the inverter so that the DC voltage does not keep rising due to the regeneration, and saving power is realized by utilizing the regeneration power, accordingly.

The invention of the twenty-third aspect has a characteristic effect such that voltage changing due to the dead time can be suppressed, and has the effect similar to that of the twenty-second aspect.

The invention of the twenty-fourth aspect has a characteristic effect such that determining the current capacity of power devices of the inverter to be greater capacity is not needed at all so that decrease in cost is realized.

The invention of the twenty-fifth aspect realizes the effect similar to that of the twenty-fourth aspect by reducing the amplitude of the output torque changing.

The invention of the twenty-sixth aspect realizes the effect similar to that of the twenty-fourth aspect, which is realized by changing the waveform of the current, voltage or torque command into a form having a lower peak current with respect to the average current.

The invention of the twenty-seventh aspect has the effect similar to that of the twenty-sixth aspect.

The invention of the twenty-eighth aspect has a characteristic effect such that the accuracy in rotor position detection can be improved, and the improvement in controlling of a motor is realized.

The invention of the twenty-ninth aspect has a characteristic effect such that the reduction of the affection of the error can be realized with accuracy, and has the effect similar to that of the twenty-eighth aspect.

The invention of the thirtieth aspect realizes the effect similar to that of the twenty-eighth aspect or the twenty-ninth aspect based upon the torque ripple The invention of the thirty-first aspect realizes the effect similar to that of thirtieth aspect based upon the torque ripple ratio with respect to an average torque.

The invention of the thirty-second aspect realizes the effect similar to that of the thirtieth aspect in correspondence with the outer condition.

What is claimed is:

1. A motor controlling method configured to control a voltage or current supplied to a motor from an inverter so as to cause suppression of rotation speed changing of the motor driving a periodical load by controlling a torque of the motor, the method comprising:
    controlling the voltage or current taking precedence over the suppression of the rotation speed changing so that a peak current is lower than or equal to the limiting current of the inverter or the motor, while increasing an average current command value.

2. The motor controlling method as set forth in claim 1, wherein
    the controlling the voltage or current so that a peak current is lower than or equal to the limiting current of the inverter or the motor is achieved by reducing an amplitude of an output torque changing.

3. The motor controlling method as set forth in claim 1, wherein
    the controlling the voltage or current so that a peak current is lower than or equal to the limiting current of the inverter or the motor is achieved by changing a waveform of the current, voltage or torque command into a form having a lower peak current with respect to an average current.

4. The motor controlling method as set forth in claim 3, wherein
    the changing of the waveform is achieved by clipping the waveform of the current, voltage or torque command with a standard value.

5. A motor controlling apparatus comprising:
a controller configured to control a voltage or current supplied to a motor from an inverter so as to cause a suppression of rotation speed changing of the motor driving a periodical load by controlling a torque of the motor; and
a control device configured to control the voltage or current taking precedence over the suppression of the rotation speed changing so that a peak current is lower than or equal to the limiting current of the inverter or the motor, while increasing an average current command value.

6. The motor controlling apparatus as set forth in claim 5, wherein
the control device controls the voltage or current so that a peak current is lower than or equal to the limiting current of the inverter or the motor by reducing an amplitude of an output torque changing.

7. The motor controlling apparatus as set forth in claim 5, wherein
the control device controls the voltage or current so that a peak current is lower than or equal to the limiting current of the inverter or the motor by changing a waveform of the current, voltage or torque command into a form having a lower peak current with respect to an average current.

8. The motor controlling apparatus as set forth in claim 7, wherein
the control device carries out the changing of the waveform by clipping the waveform of the current, voltage or torque command with a standard value.

* * * * *